(12) United States Patent
Zou

(10) Patent No.: US 10,922,825 B2
(45) Date of Patent: Feb. 16, 2021

(54) IMAGE DATA PROCESSING METHOD AND ELECTRONIC DEVICE

(71) Applicant: Lenovo (Beijing) Co., Ltd., Beijing (CN)

(72) Inventor: Libing Zou, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 163 days.

(21) Appl. No.: 16/142,904

(22) Filed: Sep. 26, 2018

(65) Prior Publication Data

US 2019/0096071 A1     Mar. 28, 2019

(30) Foreign Application Priority Data

Sep. 26, 2017   (CN) .......................... 201710884233.6

(51) Int. Cl.
*G06K 9/00*     (2006.01)
*G06T 7/246*    (2017.01)
*G06T 7/73*     (2017.01)
*H04N 1/00*     (2006.01)

(52) U.S. Cl.
CPC ............. *G06T 7/251* (2017.01); *G06T 7/74* (2017.01); *H04N 1/00129* (2013.01); *H04N 1/00209* (2013.01); *G06T 2207/20081* (2013.01)

(58) Field of Classification Search
None
See application file for complete search history.

(56) References Cited

U.S. PATENT DOCUMENTS

| 9,413,926 | B2 | 8/2016 | Aldridge et al. |
| 2017/0278262 | A1* | 9/2017 | Kawamoto ............ G06F 3/012 |
| 2018/0150718 | A1* | 5/2018 | Omari .................. G06K 9/4671 |
| 2018/0262687 | A1* | 9/2018 | Hildreth .................. G06K 9/32 |
| 2019/0058853 | A1* | 2/2019 | Brudnak .............. G05D 1/0038 |

FOREIGN PATENT DOCUMENTS

| CN | 105593924 A | 5/2016 |
| CN | 105847785 A | 8/2016 |

* cited by examiner

*Primary Examiner* — Atiba O Fitzpatrick
(74) *Attorney, Agent, or Firm* — Anova Law Group, PLLC

(57) ABSTRACT

An image data processing method is provided for a mobile terminal. The method includes receiving by a first electronic device first image data of an environment collected by a second electronic device; determining one or more motion parameters of the second electronic device based on the first image data; determining a latency between a moment the first image data being transmitted by the second electronic device and a moment the first image data being received by the first electronic device; compensating the first image data based on the one or more motion parameters of the second electronic device and the latency as determined, to generate second image data; and displaying the second image data through the first electronic device.

12 Claims, 11 Drawing Sheets

IMAGE DATA PROCESSING METHOD AND ELECTRONIC DEVICE

CROSS-REFERENCES TO RELATED APPLICATIONS

This application claims priority of Chinese Patent Application No. 201710884233.6, filed on Sep. 26, 2017, the entire contents of which are hereby incorporated by reference.

FIELD OF THE INVENTION

The present disclosure generally relates to the field of display technology and, more particularly, relates to an image data processing method and an electronic device thereof.

BACKGROUND

With more and more applications of robots in various fields, the range in which information can be exchanged between robots and user terminals (clients) becomes broader and broader. For instance, clients and robots can make remote video calls. That is, a client can control the behavior of a robot through the remote control to check the scene observed by the robot. To achieve this, the robot may collect image data based on the instructions issued from the client, process and compress the collected image data, and send it to the client.

However, there is a time delay between the moment when the client sends the instructions to the robot and the moment when the robot receives the instructions. At the same time, the robot needs to compress and transmit the video data, which also causes delay. Therefore, the moment when the client receives the image data is not exactly the moment when the image data is collected by the robot, but rather later than that. This will not only seriously affect the effects of applications of robots in manufacturing, resources exploration and exploitation, disaster relief and risk reduction, medical services, home entertainments, military, and aerospace, but also lower user experience.

BRIEF SUMMARY OF THE DISCLOSURE

A first aspect of the present disclosure is an image data processing method. The method includes receiving, by a first electronic device, first image data of an environment collected by a second electronic device; determining one or more motion parameters of the second electronic device based on the first image data; determining a latency between a moment the first image data being transmitted by the second electronic device and a moment the first image data being received by the first electronic device; compensating the first image data based on the one or more motion parameters of the second electronic device and the latency as determined, to generate second image data; and displaying the second image data through the first electronic device.

A second aspect of the present disclosure is an electronic device. The electronic device includes a processor supported by the electronic device, and a display device communicating with the processor. The processor receives first image data of an environment collected by a second electronic device, determines one or more motion parameters of the second electronic device based on the first image data, determines a latency between a moment the first image data being transmitted by the second electronic device and a moment the first image data being received by the electronic device, and compensates the first image data based on the one or more motion parameters of the second electronic device and the latency as determined, to generate second image data. Further, the display device displays the generated second image data.

A third aspect of the present disclosure is an image data processing method. The method includes collecting first image data of an environment by a second electronic device, the first image data being collected for transmission to a first electronic device; determining one or more motion parameters of the second electronic device based on the first image data; determining a latency between a moment the first image data being transmitted by the second electronic device and a moment the first image data being received by the first electronic device; compensating the first image data based on the one or more motion parameters of the second electronic device and the latency as determined, to generate second image data; and sending the second image data to the first electronic device.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

FIG. 1-2 illustrates an architectural schematic diagram of another image processing method consistent with the disclosed embodiments;

FIG. 2 illustrates a flow chart of an image data processing method consistent with the disclosed embodiments;

DETAILED DESCRIPTION

The present disclosure will be described with respect to specific embodiments and with reference to certain terms described as follows.

A robot is a machine device that automatically performs work, and that not only is able to accept human instructions, but also runs pre-programmed programs or acts according to the principles set out by the artificial intelligence technology.

A first electronic device may include various computing devices used by users, such as smartphones, tablets, and wearable devices, etc.

A position and posture refers to a combination of a position and a posture of a robot end effector in a specified coordinate system.

A depth of field refers to a range of the measured front-to-back distance of an object to be recorded in which the front edge of a camera lens or another imager can obtain a clear image.

Reference will now be made in detail to specific embodiments of the present disclosure, which are illustrated in the accompanying drawings.

In one embodiment, the image data processing method is performed on the side of the first electronic device. The first electronic device may be a smartphone, a tablet, a laptop, a wearable device (such as a pair of smart glasses, a smartwatch, etc.), or any other user device that stores applications for image data processing. The applications may include applications specific for image processing, or other applications stored in a mobile terminal. The operating system in the mobile terminal may be an Android®, iOS®, or any other operating system (e.g., Linux for mobile devices, Blackberry's QNX, etc.) developed by third parties for microcomputer architecture that includes at least a processor and a memory.

Figure 1:
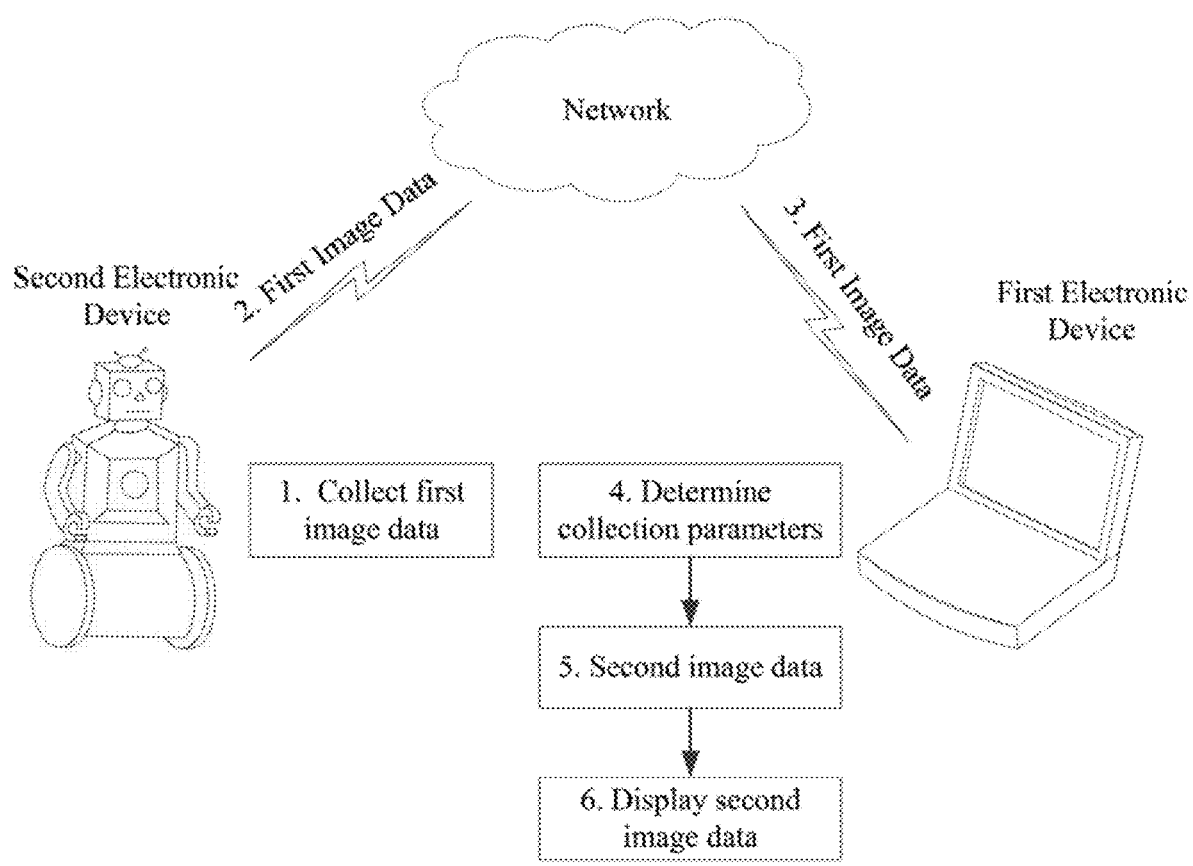
FIG. 1-1 illustrates an architectural schematic diagram of an image processing method consistent with the disclosed embodiments.

FIG. 1-1 illustrates an architectural schematic diagram of an image processing method consistent with the present embodiment. Through a network server, a first electronic device may receive first image data of the environment collected by a second electronic device (e.g., a robot) in a first collection position and posture. Based on the received first image data, the first electronic device may determine display parameters corresponding to the first image data for the moment when the first image data is received. Based on the determined display parameters, the first electronic device may process the first image data to generate second image data, and display the generated second image data.

Figures 1, 2:
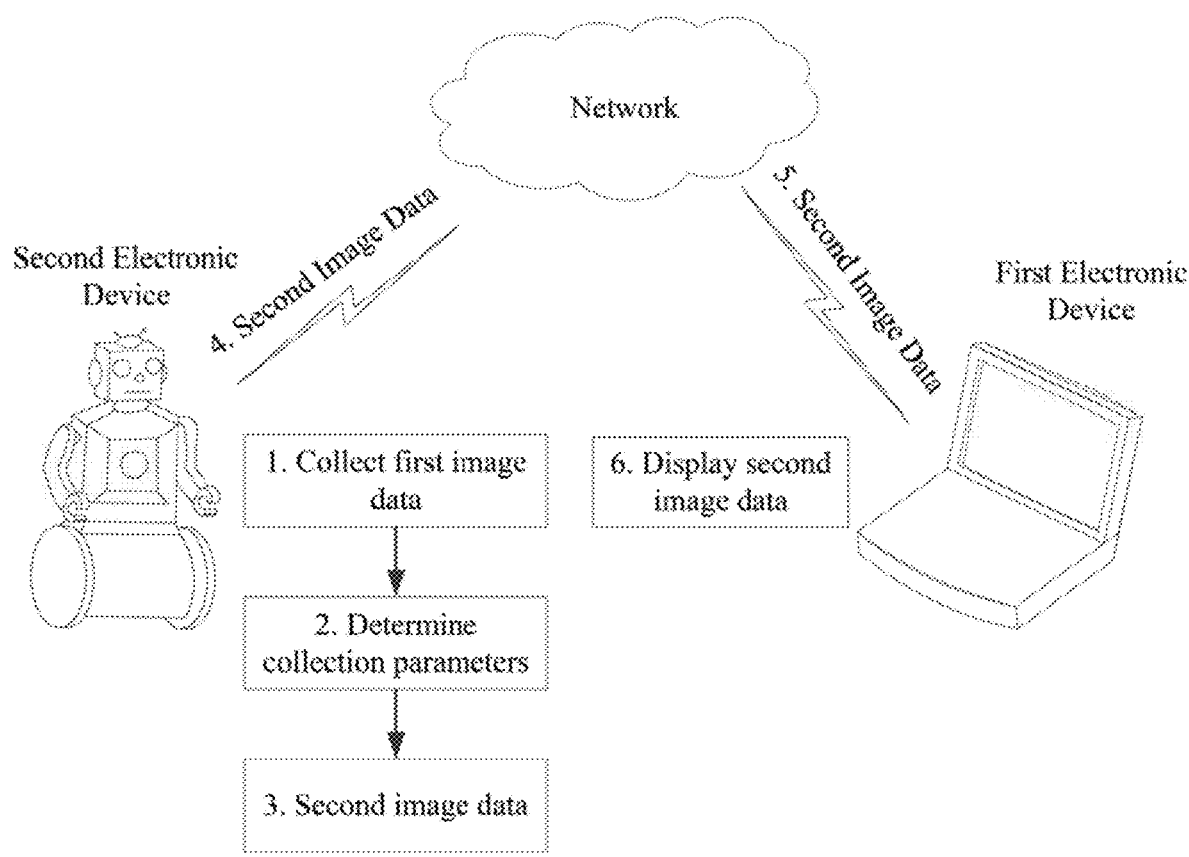
Figure 2:
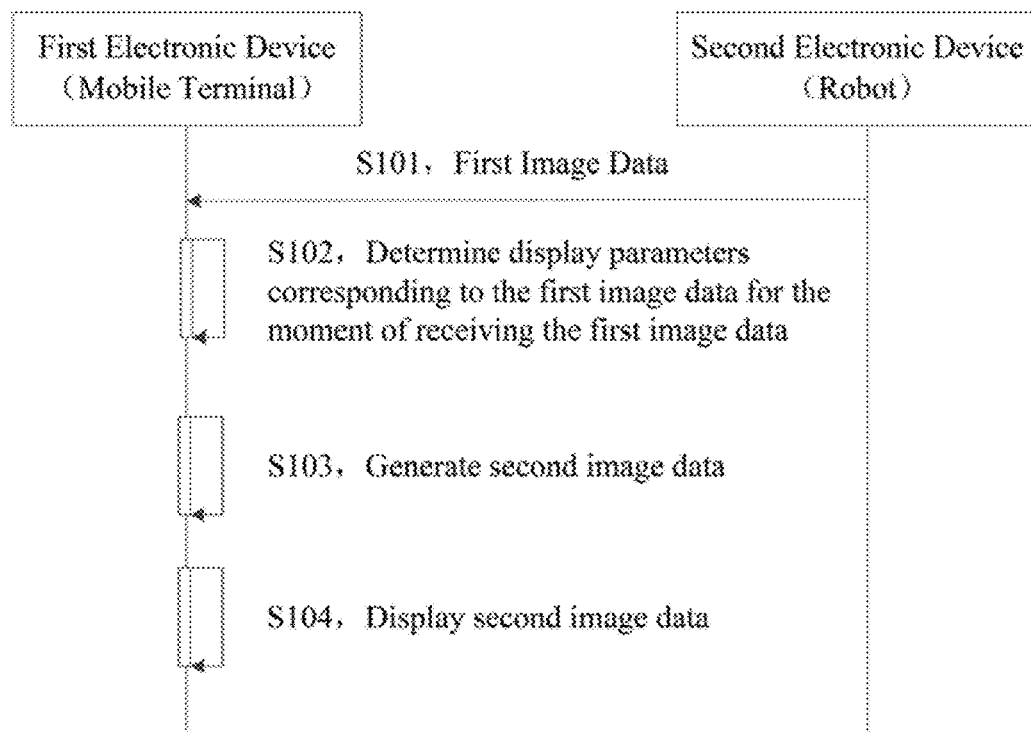

Reference will now be made in detail to an image data processing method consistent with the accompanying architecture schematic diagram of FIG. 1-1 of the present embodiment. A flow chart of the image data processing method consistent with the embodiment is illustrated in FIG. 2, description of which is provided as follow.

Step S101: The first electronic device receives the first image data of the environment collected by the second electronic device in the first collection position and posture.

In certain embodiments, the first electronic device may send an instruction for image data collection to the second electronic device. Based on the instruction, the second electronic device may collect the first image data of the environment in the first collection position and posture. The second electronic device may then send the collected first image data to the first electronic device through the network, to allow the first image data to be received by the first electronic device.

The first collection position and posture may be a position and posture of the second electronic device when receiving the instruction, or a position and posture provided by and included in the instruction sent by the first electronic device for image data collection.

Step S102: The first electronic device determines, based on the first image data, display parameters corresponding to the first image data for the moment when the first image data is received.

In certain embodiments, the first electronic device may determine, based on the first image data, a second collection position and posture of the second electronic device for the moment when the first image data is received, and determine display parameters that match the second collection position and posture for the moment when the first image data is displayed.

In the above-disclosed embodiment, at least the following implementations may be implemented by the first electronic device to determine the collection position and posture of the second electronic device for the moment when the first image data is received.

In one implementation, upon receiving the first image data, the first electronic device may extract motion parameters of the second electronic device included in the first image data, and determine a latency (i.e., a transmission delay time) caused by the data transmission and the instruction transmission between the first electronic device and the second electronic device. Based on the motion parameters and the latency, the first electronic device may update the recorded collection position and posture (e.g., the first collection position and posture in the record) of the second electronic device, to generate the second collection position and posture.

The collected motion parameters of the second electronic device may include at least the moving speed and the moving direction of the second electronic device.

The latency may be determined as follows: the first electronic device may determine, based on the received first image data, the time when the first electronic device receives the first image data, and the time when the second electronic device sends the first image data. Based on the difference between the time when the first electronic device receives the first image data and the time when the second electronic device sends the first image data, the latency may be determined.

In another implementation, the first electronic device may train a machine learning model based on a plurality of historical image data received from the second electronic device, and determine the motion parameters of the second electronic device and the latency based on the machine learning model. Based on the determined motion parameters and the latency, the recorded collection position and posture of the second electronic device may be updated to obtain the second collection position and posture.

To train the machine learning model, the first electronic device may build training samples and corresponding target states based on a plurality of samples of historical image data sent from the second electronic device. The training samples may include the time when the second electronic device sends data, the time when the first electronic device receives the data, the collection position and posture in which the second electronic device collects the data, and the motion parameters of the second electronic device. The corresponding target states may include the motion parameters of the second electronic device at the moments when the first electronic device receives the data and the latency. The machine learning model may then be trained to allow it to predict the corresponding target states based on the training samples. The received image data may then be fed into the trained machine learning model to predict the target states (e.g., the motion parameters of the second electronic device at the moment when the first electronic device receives the data and the latency).

In another implementation, upon receiving the first image data, the first electronic device may extract the second collection position and posture of the second electronic device included in the first image data. In this implementation, the second electronic device may determine its own second collection position and posture, and include the determined second collection position and posture in the first image data to send to the first electronic device. The second electronic device may determine the second collection position and posture based on the above-described method of training a machine learning model, or based on its own motion parameters and latency.

Based on the above description, after determining the second collection position and posture of the second electronic device for the moment when the first image data is received, the first electronic device may determine the amount of change of the collection position and posture of the second electronic device based on the first collection position and posture and the second collection position and posture. Based on the amount of change of the collection position and posture, the first electronic device may determine display compensation parameters. The display compensation parameters may include the depth of field compensation parameters, which relate to a motion parameter of the second electronic device corresponding to a varying depth of field of the second electronic device, and the angle of view compensation parameters, which relate to a motion parameter of the second electronic device corresponding to a varying angle of view of the second electronic device. By compensating the display parameters of the first image data with the display compensation parameters based on one or more motion parameters of the second electronic device, display parameters that match the second collection position and posture for the moment of displaying the first image data may be obtained.

Step S103: Based on the determined display parameters, the first image data is processed to generate second image data.

In certain embodiments, the first electronic device may revise the first image data based on the determined display parameters, including revising the depth of field and the angle of view of the first image data to generate the second image data.

Figure 3:
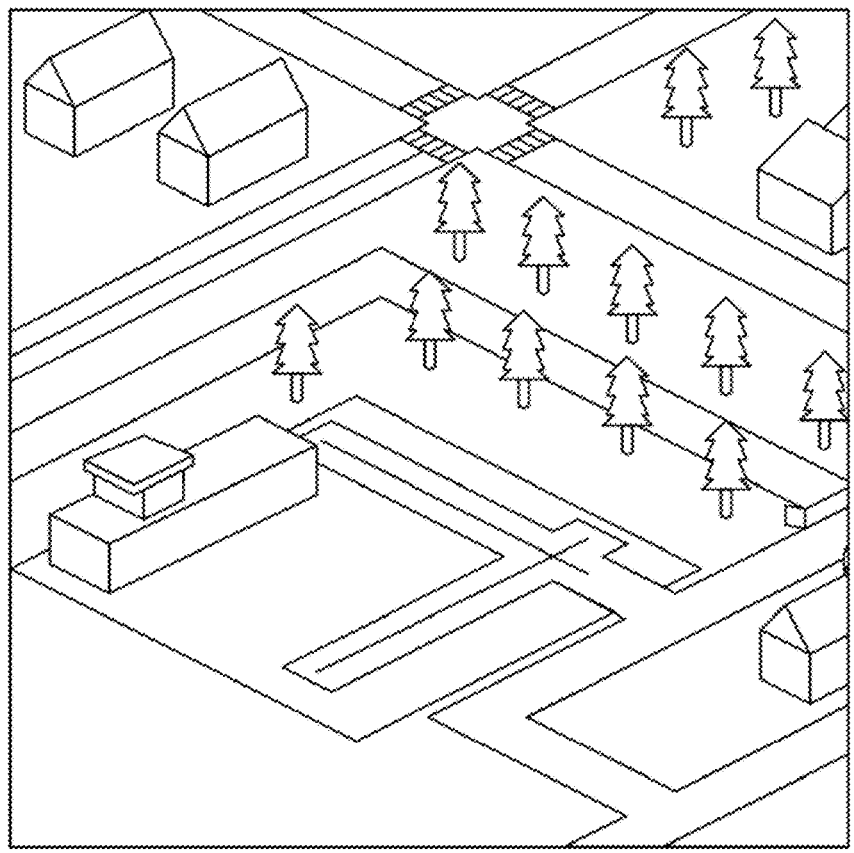
FIG. 3 illustrates a schematic diagram of an image collected at a time T1 consistent with the disclosed embodiment.
Figure 4:
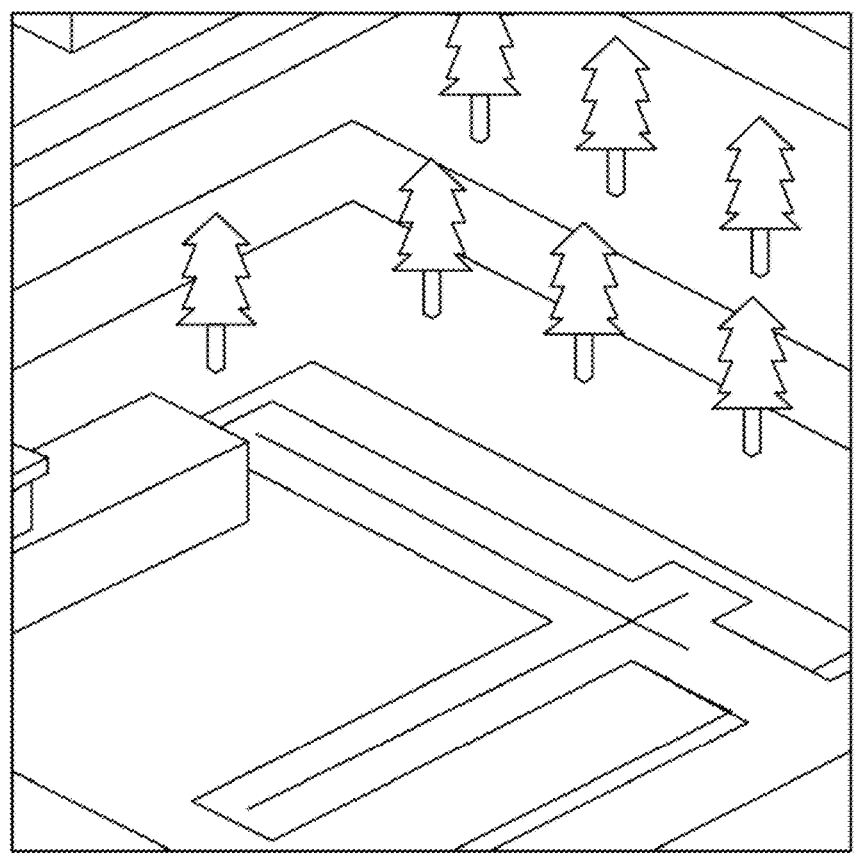
FIG. 4 illustrates a schematic diagram of an image collected at a time T2 consistent with the disclosed embodiment.

For example, when the second electronic device moves straight forward, the angle of view of the first image data may not change when the first image data is being processed. By changing the depth of field of the first image data, a portion of (such as the center area) the image corresponding to the first image data may be enlarged to a certain degree. As an example, as shown in FIG. 3, at time T1 when the second electronic device collects the first image data at the first collection position and posture, the image size corresponding to the first image data may be A. In the process of processing and sending the first image data to the first electronic device, there may be a data processing delay and a data transmission delay. During the period ΔT of the data processing delay and the data transmission delay, the position of the second electronic device may have changed from a position corresponding to the first collection position and posture to a position corresponding to the second position and posture. The time when the second electronic device collects image data in the second collection position and posture may be time T2 (T2=T1+ΔT). Compared to the first image data collected by the second electronic device in the first collection position and posture at T1, the image data collected by the second electronic device in the second collection position and posture at time T2 may show no change in image content but a larger image size. As shown in FIG. 4, by display zoom-based processing of the first image data collected by the second electronic device in the first collection position and posture at T1, the size of the image, displayed at T2, that corresponds to the first image data may be B that is larger than A. During the process, a specific portion (e.g., the center area) of the first image corresponding to the first image data may be enlarged (i.e., zoomed-in).

Figure 5:
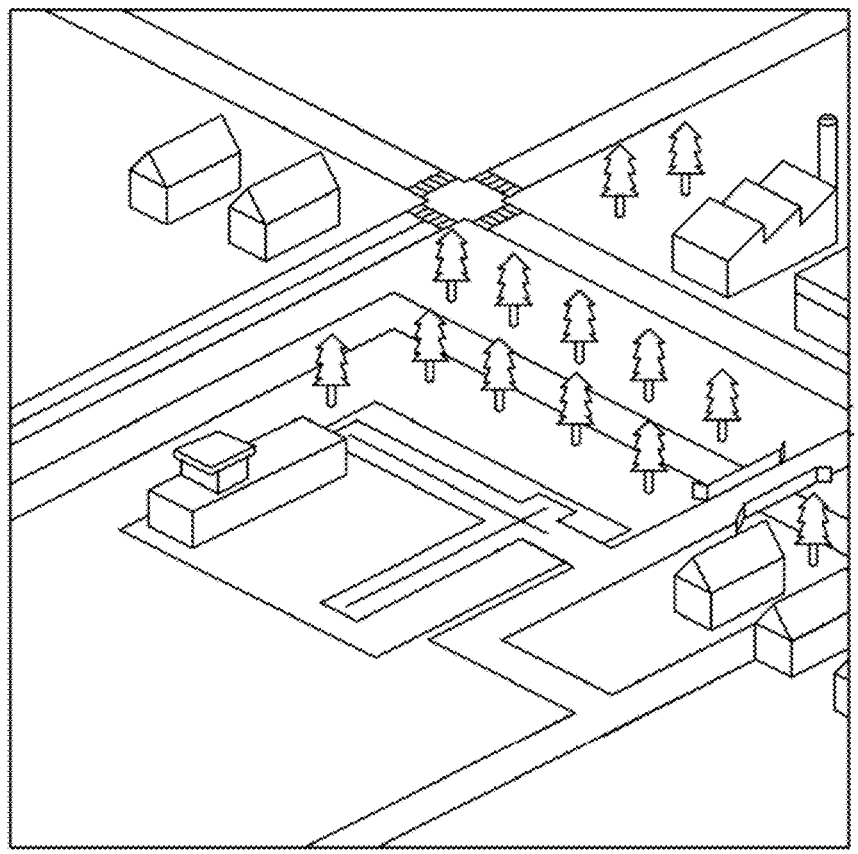
FIG. 5 illustrates another schematic diagram of an image collected at a time T2 consistent with the disclosed embodiment.

Similarly, when the second electronic device moves straight backward, in processing the first image data, the angle of view of the first image data may not change. By changing the depth of field of the first image data, the first image or a portion of the first image (e.g., the center area) corresponding to the first image data may be reduced (i.e., zoomed-out) to a certain degree, as shown in FIG. 5.

Step S104: The second image data may be displayed.

The first electronic device may display the second image data through its own display device (e.g., a screen).

In another embodiment, the image data processing method is performed on the side of the second electronic device. The second electronic device may be an electronic device (e.g., a robot, etc.) that is able to collect image, process data, and transmit data. The second electronic device may store an application for image data processing. The application may be a specialized application specific for image data processing.

FIG. 1-2 illustrates an architectural schematic diagram of an image processing method consistent with the present embodiment. A second electronic device (e.g., a robot) may collect first image data of the environment at a first collection position and posture. Based on the first image data, the second electronic device may determine display parameters for the first image data for the moment when the first image data is received by a first electronic device. Based on the determined display parameters, the second electronic device may process the first image data to generate second image data, and send the generated second image data to the first electronic device through the network.

Figure 6:
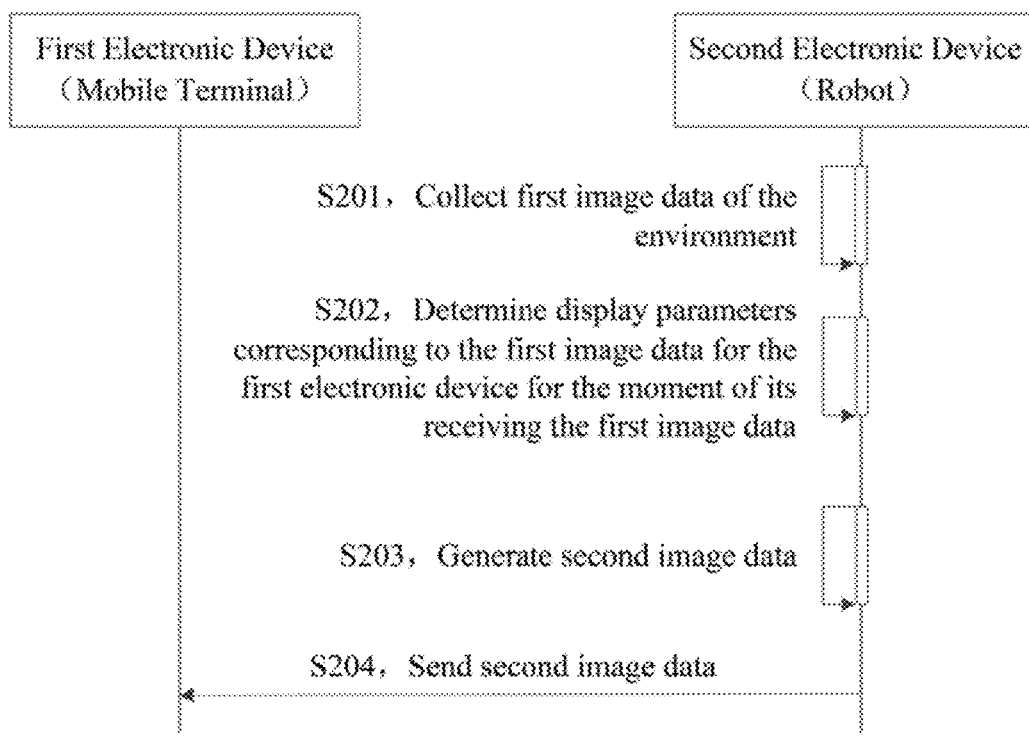
FIG. 6 illustrates a flow chart of another image data processing method consistent with the disclosed embodiments.

Reference will now be made in detail to an image data processing method consistent with the accompanying architecture schematic diagram of FIG. 1-2 of the present embodiment. A flow chart of the image data processing method consistent with the embodiment is illustrated in FIG. 6, description of which is provided as follow.

Step S201: The second electronic device collects the first image data of the environment in the first collection position and posture.

In certain embodiments, the first electronic device may send an instruction for image data collection to the second electronic device. The second electronic device may collect the first image data of the environment in the first collection position and posture based on the instruction.

The first collection position and posture may be a position and posture of the second electronic device when receiving the instruction, or a position and posture provided by and included in the instruction sent by the first electronic device for image data collection.

Step S202: The second electronic device determines, based on the first image data, display parameters corresponding to the first image data for the first electronic device for the moment when the first image data is received by the first electronic device.

In certain embodiments, the second electronic device may determine, based on the first image data, a second collection position and posture of the second electronic device for the moment when the first image data is received by the first electronic device, and determine display parameters that match the second collection position and posture for the moment when the first electronic device displays the first image data.

In the above-disclosed embodiments, at least the following implementations may be implemented by the second electronic device to determine the collection position and posture of the second electronic device for the moment when the first image data is received.

In one implementation, based on its own motion parameters and the latency, the second electronic device may update its collection position and posture in the record to obtain the second collection position and posture.

The motion parameters of the second electronic device may include at least the moving speed and the moving direction of the second electronic device.

One approach to determine the latency: the first electronic device may determine, based on the received first image data, the time when it receives the first image data, and the time when second electronic device sends the first image data, and based on a difference between the time when the first electronic device receives the first image data and the time when the second electronic device sends the first image data, the latency may be determined.

In another implementation, the second electronic device may train a machine learning model based on a plurality of historical image data sent to the first electronic device, and determine the motion parameters of the second electronic device and the latency based on the machine learning model. Based on the determined motion parameters and the latency, the recorded collection position and posture of the second electronic device may be updated to obtain the second collection position and posture.

To train the machine learning model, the second electronic device may build training samples and target states based on a plurality of samples of historical image data sent to the first electronic device. The training samples may include the time when the second electronic device sends data, the time when the first electronic device receives the data, the collection positions and postures used by the second electronic device to collect the data, and motion parameters of the second electronic device. The corresponding target states may include the motion parameters of the second electronic device at the moments when the first electronic device receives the data, and the latency. The machine learning model may then be trained to predict corresponding target states based on the training samples set up in the training. The received image data may then be fed into the trained machine learning model to predict the target states, such as the motion parameters of the second electronic device at the moment when the first electronic device receives the data, and the latency.

In another implementation, the second electronic device may determine its second collection position and posture based on predefined strategies.

Based on the above description, after determining the second collection position and posture of the second electronic device for the moment when the first electronic device receives the first image data, the second electronic device may determine the amount of change of the collection position and posture of the second electronic device based on the first collection position and posture and the second collection position and posture. Based on the amount of change of the collection position and posture, the second electronic device may further determine display compensation parameters. The display compensation parameters may include the depth of field compensation parameters and the angle of view compensation parameters. By compensating the display parameters of the first image data with the display compensation parameters, display parameters that match the second collection position and posture for the moment of displaying the first image data by the first electronic device may then be obtained.

Step S203: The second electronic device processes the first image data based on the determined display parameters to generate second image data.

In certain embodiments, the second electronic device may revise the first image data according to the determined display parameters, including revising the depth of field and the angle of view of the first image data to generate the second image data.

Figure 7:
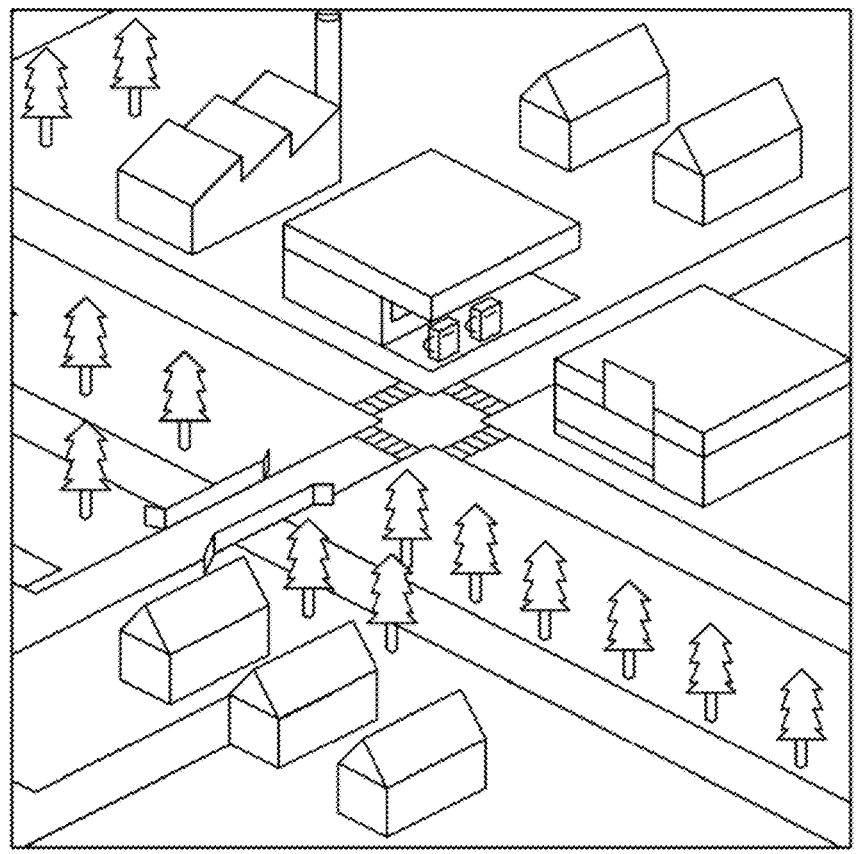
FIG. 7 illustrates a schematic diagram of an image at a time T3 consistent with the disclosed embodiment.
Figure 8:
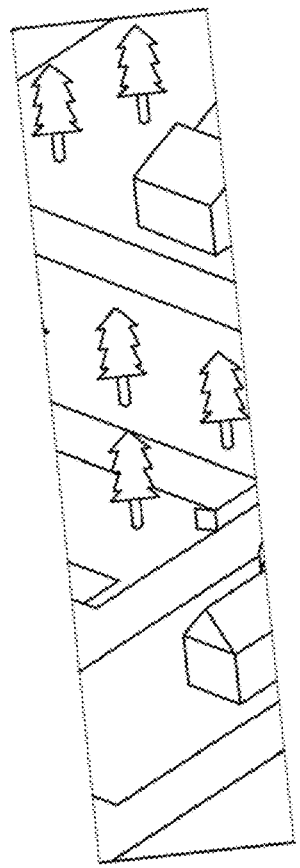
FIG. 8 illustrates a schematic diagram of an overlap of an image at a time T1 and at a time T3 consistent with the disclosed embodiment.

For example, when the second electronic device makes a turn, at the moment the first image data is being processed, both the angle of view and the depth of field of the first image data have changed. The first image corresponding to the first image data collected by the second electronic device at time T1, is shown in FIG. 3, and the second image corresponding to the image data collected by the second electronic device at time T3 is shown in FIG. 7. T3 is the time when the first electronic device receives the first image data. From FIG. 3 and FIG. 7, it can be seen that at time T3, the image data collected by the second electronic device may include part of the content of the first image data, as shown in FIG. 8. Therefore, in order to make the first image data received by the first electronic device to match the image data collected by the second electronic device at time T3, an overlapping portion of the image data collected by the second electronic device at T3 and the first image data collected by the second electronic device at T1 may be isolated. For the isolated image data, the collection position and posture of the second electronic device at T1 is different from that at T3. Therefore, at T3, the display parameters (e.g., depth of field and angle of view) of the isolated image data may have changed. By revising the isolated image data based on the revised (or compensated) display parameters, the second image data that match the collection position and posture of the second electronic device at T3 may be obtained.

Step S204: The second image data is sent to the first electronic device.

In certain embodiments, the second electronic device may send the second image data to the first electronic device to allow the second image data to be displayed on the first electronic device.

In the above-disclosed embodiments, during the image data-based communications between the first electronic device and the second electronic device, the second electronic device may also send its own position information and moving direction information to the first electronic device. This may allow the first electronic device to synchronize the map of the location of the second electronic device in real time during the remote communication between the first electronic device and the second electronic device.

Figure 9:
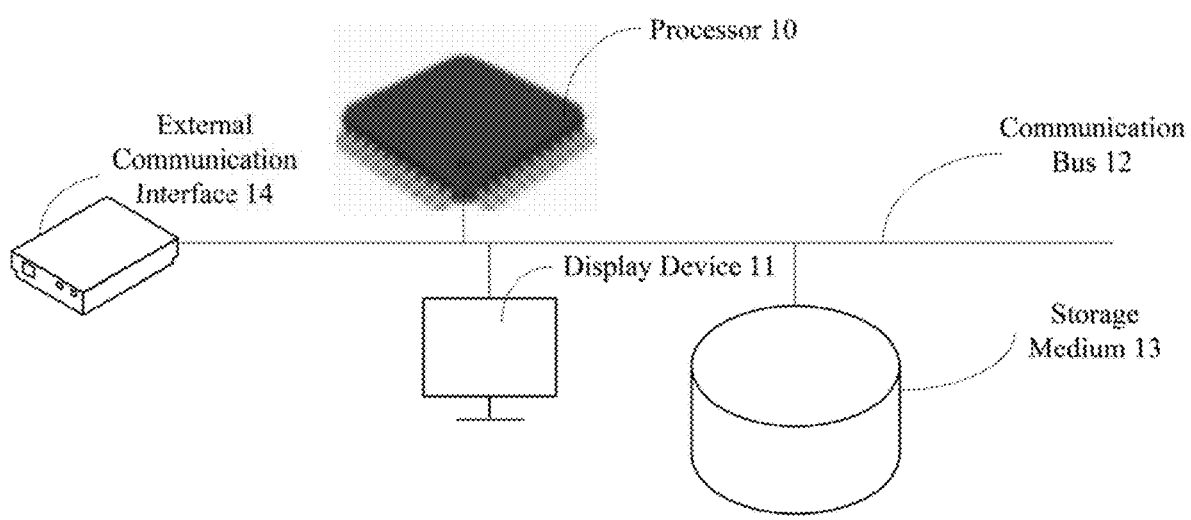
FIG. 9 illustrates a structural diagram of an electronic device consistent with disclosed embodiments.

FIG. 9 illustrates a structural diagram of an electronic device (e.g., a first electronic device) consistent with disclosed embodiments. As shown in the figure, the electronic device includes a processor 10, a display device 11, a storage medium 13, and an external communication interface 14. The processor 10, the display device 11, the storage medium 13, and the external communication interface 14 are all connected via a communication bus 12.

In operation, the processor 10 is provided for receiving first image data of the environment collected by a second electronic device in a first collection position and posture, determining, based on the first image data, display parameters corresponding to the first image data for the moment of receiving the first image data, and processing the first image data based on the determined display parameters to generate second image data.

The display device 11 is provided for displaying the second image data.

Figure 10:
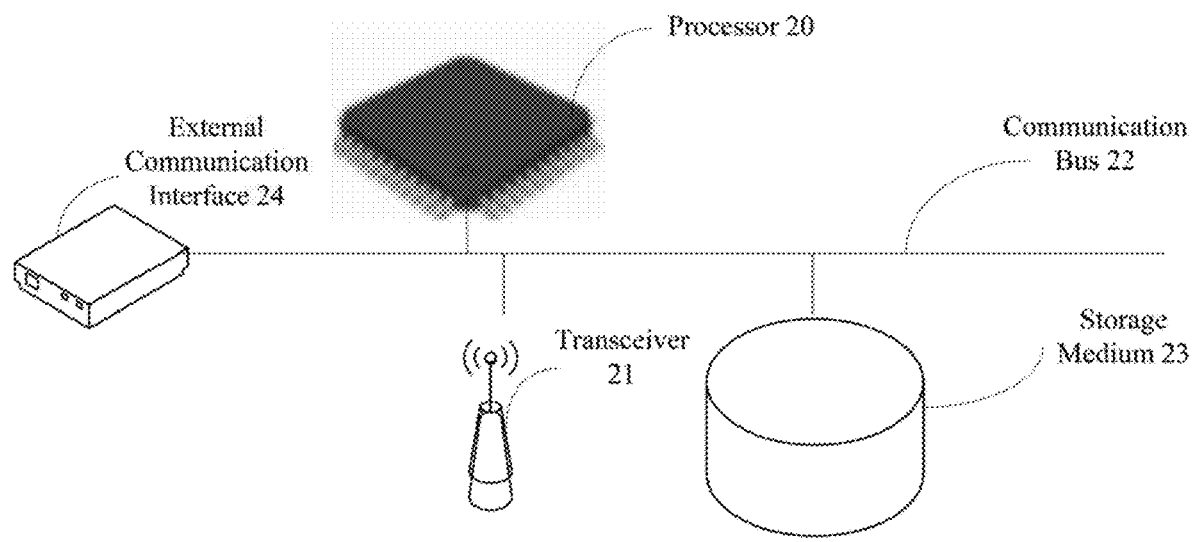
FIG. 10 illustrates a structural diagram of another electronic device consistent with disclosed embodiments.

FIG. 10 illustrates a structural diagram of another electronic device (e.g., a second electronic device) consistent with disclosed embodiments. As shown in the figure, the electronic device includes a processor 20, a transceiver 21, a storage medium 23, and at least one external communication interface 24. The processor 20, the transceiver 21, the storage medium 23, and the external communication interface 24 are all connected with a communication bus 22.

In operation, the processor 20 is provided for collecting first image data of the environment in a first collection position and posture, determining, based on the first image data, display parameters corresponding to the first image data for the moment when a first electronic device receives the first image data; and processing the first image data based on the determined display parameters to generate second image data.

The transceiver 21 is provided for sending the second image data to the first electronic device.

It should be understood by those skilled in the art that the implementation of all or part of the steps of the above-described embodiments may be accomplished through the program or instruction-related hardware. The aforementioned programs may be stored in a computer-readable storage medium. When executed, the programs may allow implementation of all or part of the steps of methods of the disclosed embodiments. The aforementioned storage medium may include a mobile storage device, a read-only memory (ROM), a random access memory (RAM), a magnetic disk, an optical disk, or any other medium that can store program code.

Alternatively, the aforementioned integrated units of the present disclosure may also be stored in a computer-readable storage medium if it is implemented in the form of a software function module and sold or used as an independent product. Based on such understanding, the technical solutions of the embodiments of the present disclosure, or essentially the part that contributes to the conventional technology, can be embodied in the form of a software product that may be stored in a storage medium and include instructions that, when executed, cause a computing device (e.g., a personal computer, a server, a network device, etc.) to implement all or part of the methods described in the various embodiments of the present invention. The aforementioned storage medium may include a mobile storage device, a ROM, a RAM, a magnetic disk, an optical disk, or any other medium that can store program code.

Accordingly, the various embodiments of the present disclosure further provide a computer storage medium that stores executable instructions. The executable instructions, when executed by a processor, cause the above-described image data processing methods to be implemented.

In the disclosed embodiments, display parameters corresponding to the first image data for the moment when the first electronic device receives the first image data is first determined. Based on the display parameters, the first image data is further processed to generate the second image data. In this way, the time delay caused by the instruction transmission and data transmission between the first electronic device and the second electronic device, the time delay caused by the second electronic device in processing the image data for sending to the first electronic device may be compensated. After the compensation, the image data received by the first electronic device is current (i.e., the moment of receiving the image data) image data, which thus enhances user experience.

Although the present disclosure has been described as above with reference to the specific embodiments, it should be understood that these embodiments are not constructed as limiting the present disclosure. Various modifications and variations may be made by those skilled in the art without departure from the spirit and scope of the present disclosure, and the protection scope of the present disclosure is defined by the appended claims.

What is claimed is:

1. An image data processing method, comprising:
   receiving, by a first electronic device, first image data of an environment collected by a second electronic device;
   determining, by the first electronic device, one or more motion parameters, including a moving speed and a moving direction relative to the environment, of the second electronic device based on the first image data;
   determining a latency between a moment the first image data being transmitted by the second electronic device and a moment the first image data being received by the first electronic device;
   compensating the first image data based on the one or more motion parameters of the second electronic device and the latency as determined, to generate second image data by the first electronic device; and
   displaying the second image data through the first electronic device.

2. The image data processing method according to claim 1, wherein the step of determining the one or more motion parameters of the second electronic device further includes:
   determining a varying depth of field parameter of the second electronic device.

3. The image data processing method according to claim 1, wherein the step of determining the one or more motion parameters of the second electronic device further includes:
   determining a varying angle of view parameter of the second electronic device.

4. The image data processing method according to claim 1, wherein the step of compensating the first image data based on the one or more motion parameters of the second electronic device and the latency as determined further includes:
   training a machine learning model, based on a plurality of historical image data received from the second electronic device so as to determine the one or more motion parameters of the second electronic device and said latency based on the machine learning model.

5. The image data processing method according to claim 1, wherein the step of determining the one or more motion parameters of the second electronic device further includes:
   determining a plurality of collection positions and postures of the second electronic device from the first image data.

6. The image data processing method according to claim 1, wherein the step of determining said latency comprises:
   determining a time when the first image data is sent out from the second electronic device;
   determining a time when the first image data is received by the first electronic device; and
   determining the latency based on a difference between the time when the first image data is sent out from the second electronic device and the time when the first image data is received by the first electronic device.

7. An electronic device, comprising:
a processor supported by the electronic device, wherein the processor receives first image data of an environment collected by a second electronic device, determines one or more motion parameters, including a moving speed and a moving direction of the second electronic device relative to the environment based on the first image data, determines a latency between a moment the first image data being transmitted by the second electronic device and a moment the first image data being received by the electronic device, and compensates the first image data based on the one or more motion parameters of the second electronic device and the latency as determined, to generate second image data; and
a display device communicating with the processor, wherein the display device displays the generated second image data.

8. An image data processing method, comprising:
collecting first image data of an environment by a second electronic device, the first image data being collected for transmission to a first electronic device;
determining one or more motion parameters of the second electronic device, including a moving speed and a moving direction relative to the environment, based on the first image data by the second electronic device;
determining a latency between a moment the first image data being transmitted by the second electronic device and a moment the first image data being received by the first electronic device by the second electronic device;
compensating the first image data based on the one or more motion parameters of the second electronic device and the latency as determined, to generate second image data by the second electronic device; and
sending the second image data to the first electronic device.

9. The imaging apparatus according to claim 8, wherein the step of determining the one or more motion parameters of the second electronic device further includes:
determining a varying depth of field parameter of the second electronic device.

10. The imaging apparatus according to claim 8, wherein the step of determining the one or more motion parameters of the second electronic device further includes:
determining a varying angle of view parameter of the second electronic device.

11. The imaging apparatus according to claim 8, wherein the step of compensating the first image data based on the one or more motion parameters of the second electronic device and the latency as determined further includes:
training a machine learning model, based on a plurality of historical image data received from the second electronic device so as to determine the one or more motion parameters of the second electronic device and said latency based on the machine learning model.

12. The imaging apparatus according to claim 8, wherein the step of determining the one or more motion parameters of the second electronic device further includes:
determining a plurality of collection positions and postures of the second electronic device from the first image data.

* * * * *